(12) United States Patent
Majima

(10) Patent No.: US 9,296,581 B2
(45) Date of Patent: Mar. 29, 2016

(54) DOCUMENT FEEDER AND IMAGE FORMING APPARATUS

(71) Applicant: KYOCERA Document Solutions Inc., Osaka-shi (JP)

(72) Inventor: Tatsuya Majima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/730,042

(22) Filed: Jun. 3, 2015

(65) Prior Publication Data

US 2015/0353309 A1     Dec. 10, 2015

(30) Foreign Application Priority Data

Jun. 6, 2014   (JP) ................. 2014-117937

(51) Int. Cl.
| | |
|---|---|
| *B65H 7/20* | (2006.01) |
| *H04N 1/00* | (2006.01) |
| *B65H 1/04* | (2006.01) |
| *B65H 1/14* | (2006.01) |
| *B65H 7/02* | (2006.01) |

(52) U.S. Cl.
CPC .. *B65H 7/20* (2013.01); *B65H 1/04* (2013.01); *B65H 1/14* (2013.01); *B65H 7/02* (2013.01); *H04N 1/0057* (2013.01); *H04N 1/00482* (2013.01); *H04N 1/00652* (2013.01); *H04N 1/00663* (2013.01)

(58) Field of Classification Search
USPC ........................................ 358/1.13
See application file for complete search history.

(56) References Cited

U.S. PATENT DOCUMENTS

| | | | | |
|---|---|---|---|---|
| 6,003,861 A | * | 12/1999 | Iizumi ................ | B42C 1/12 271/215 |
| 2009/0226191 A1 | * | 9/2009 | Miyake ............. | G03G 15/6544 399/16 |
| 2010/0322689 A1 | * | 12/2010 | Ohtani .................... | B65H 1/04 399/388 |

FOREIGN PATENT DOCUMENTS

JP     2005-330027 A     12/2005

\* cited by examiner

*Primary Examiner* — Ngon Nguyen
(74) *Attorney, Agent, or Firm* — Studebaker & Brackett PC

(57) ABSTRACT

A document feeder includes a lift plate, a storage section, and an operation display section. The lift plate lifts a document sheaf up to a feed position. The storage section stores a first travel amount. The first travel amount is a travel amount of the lift plate necessary for the lift plate to cause the document sheaf to arrive at the feed position in a situation in which the document sheaf has a maximum permitted thickness. When a second travel amount is less than the first travel amount, the operation display section informs that the number of the document sheets in the document sheaf exceeds a maximum sheet number. The second travel amount is a travel amount of the lift plate taken to cause the topmost part of the document sheaf to arrive at the feed position.

8 Claims, 10 Drawing Sheets

DOCUMENT FEEDER AND IMAGE FORMING APPARATUS

INCORPORATION BY REFERENCE

The present application claims priority under 35 U.S.C. §119 to Japanese Patent Application No. 2014-117937, filed Jun. 6, 2014. The contents of this application are incorporated herein by reference in their entirety.

BACKGROUND

The present disclosure relates to document feeders and image forming apparatuses.

To an image forming apparatus including an image reading section that reads an original document, a document feeder may be fitted for conveying the original document to a reading point of the image reading section.

Such a document feeder may include a document setting tray (document table), a document conveyance path extending from the document setting tray to the reading point, a pickup roller, a conveyance roller, etc. An original document is loaded on the document setting tray. The pickup roller feeds the original document loaded on the document setting tray to the document conveyance path. The conveyance roller conveys the original document fed to the document conveyance path to the reading point. The document setting tray has a downstream end portion in terms of document conveyance direction that serves as a lift plate (movable document table) capable of ascending and descending.

In order to convey an original document loaded on the document setting tray, the document feeder having the above configuration first causes the lift plate to ascend. Ascending of the lift plate lifts up the leading end part of the original document loaded on the document setting tray toward the pickup roller. When the leading end part of the original document comes in contact with the pickup roller, the pickup roller rotates. A document sheet of the original document is accordingly drawn out from the document setting tray and fed to the document conveyance path. The document sheet fed to the document conveyance path is conveyed by the conveyance roller along the document conveyance path.

SUMMARY

A document feeder according to the present disclosure includes a document conveyance path along which an original document is conveyed, a lift plate, a sheet feed section, a document conveyance section, an upper limit sensor, a control section, a storage section, and an operation display section. The lift plate waits for loading of a document sheaf of one or more document sheets at a predetermined standby position. The lift plate ascends from the standby position with the document sheaf loaded thereon to lift the document sheaf up to a predetermined feed position. The sheet feed section performs a document feeding operation for feeding to the document conveyance path, a document sheet in the document sheaf that arrives at the feed position. The document conveyance section performs a document conveyance operation for conveying along the document conveyance path, a document sheet in the document sheaf fed to the document conveyance path. In response to the document sheaf arriving at the feed position, the upper limit sensor outputs a value indicating that the document sheaf arrives at the feed position. The control section determines whether or not the document sheaf arrives at the feed position based on a value output from the upper limit sensor. The storage section stores a first travel amount. The first travel amount is a travel amount of the lift plate from the standby position necessary for the lift plate to cause a topmost part of the document sheaf loaded on the lift plate to arrive at the feed position in a situation in which the document sheaf has a maximum permitted thickness. The operation display section receives an input operation and displays information. The control section further obtains a second travel amount. The second travel amount is a travel amount of the lift plate taken to cause the topmost part of the document sheaf to arrive at the feed position after a start of ascension of the lift plate from the standby position. The control section determines that the number of document sheets in the document sheaf loaded on the lift plate exceeds a preset maximum sheet number when the second travel amount is less than the first travel amount. In response to determining by the control section that the number of the document sheets in the document sheaf loaded on the lift plate exceeds the maximum sheet number, the operation display section displays an information screen for notifying that the number of the document sheets in the document sheaf loaded on the lift plate exceeds the maximum sheet number.

DETAILED DESCRIPTION

An embodiment of the present disclosure will be described by referring to a multifunction peripheral having a plurality of functions such as functions of a printer, a copier, etc.

Overall Configuration of Multifunction Peripheral

Figure 1:
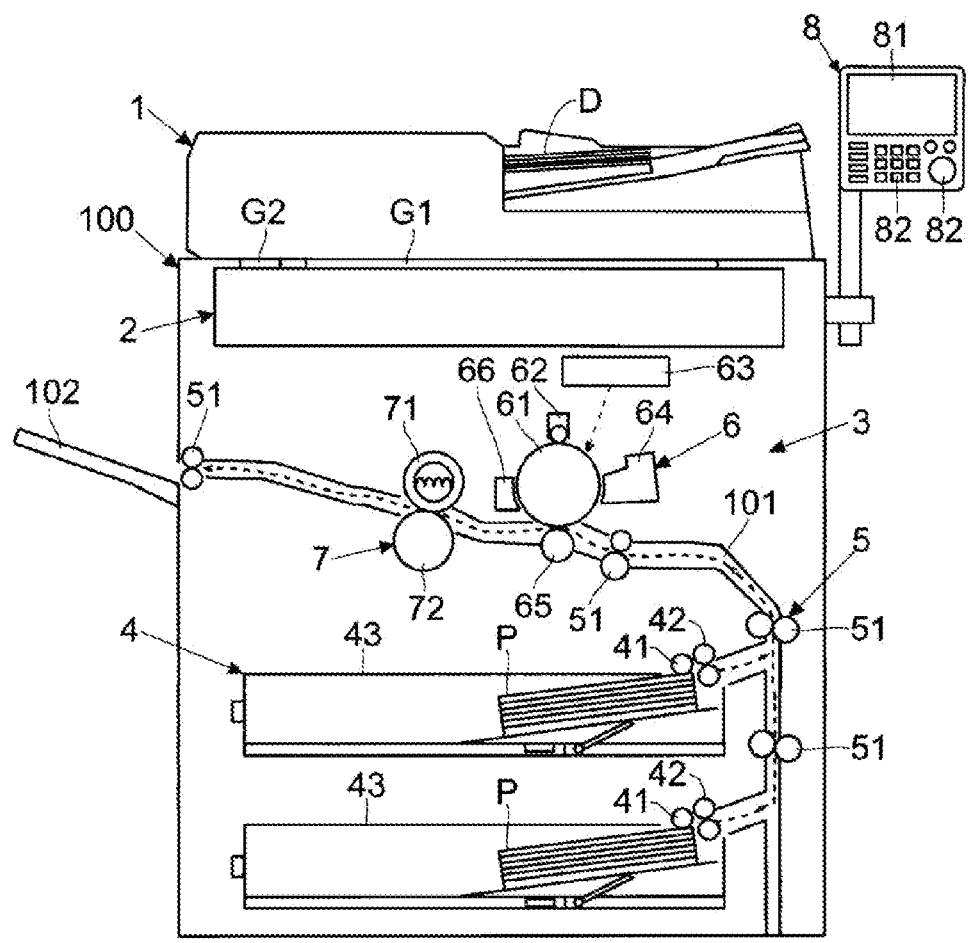
FIG. 1 is a diagram illustrating a multifunction peripheral including a document feeder according to an embodiment of the present disclosure.

As illustrated in FIG. 1, a multifunction peripheral 100 according to the present embodiment includes a document feeder 1. The configuration of the document feeder 1 will be described later in detail. The multifunction peripheral 100 further includes an image reading section 2 and a printing section 3.

The image reading section 2 is capable of executing place reading and conveyance reading. In place reading, the image reading section 2 reads a document sheet D placed on a main contact glass G1 and generates image data. Alternatively, in conveyance reading, the image reading section 2 reads a document sheet D conveyed onto a sub contact glass G2 by the document feeder 1 and generates image data.

The printing section 3 includes a sheet feed section 4, a sheet conveyance section 5, an image forming section 6, and a fixing section 7. The sheet feed section 4 includes a pickup roller 41 and a sheet feed roller pair 42 and feeds a sheet P stored in a sheet feed cassette 43 to a sheet conveyance path 101. The sheet conveyance section 5 includes a plurality of conveyance roller pairs 51 and conveys the sheet P along the sheet conveyance path 101. The sheet conveyance section 5 ejects the sheet P having undergone printing onto a sheet exit tray 102.

The image forming section 6 includes a photosensitive drum 61, a charger 62, an exposure device 63, a developing device 64, a transfer roller 65, and a cleaning device 66. The image forming section 6 forms a toner image based on the image data and transfers the toner image to the sheet P. The fixing section 7 includes a heating roller 71 and a pressure roller 72 and applies heat and pressure to the sheet P to which the toner image has been transferred. In this manner, the toner image is fixed to the sheet P.

Configuration of Document Feeder

Figure 2:
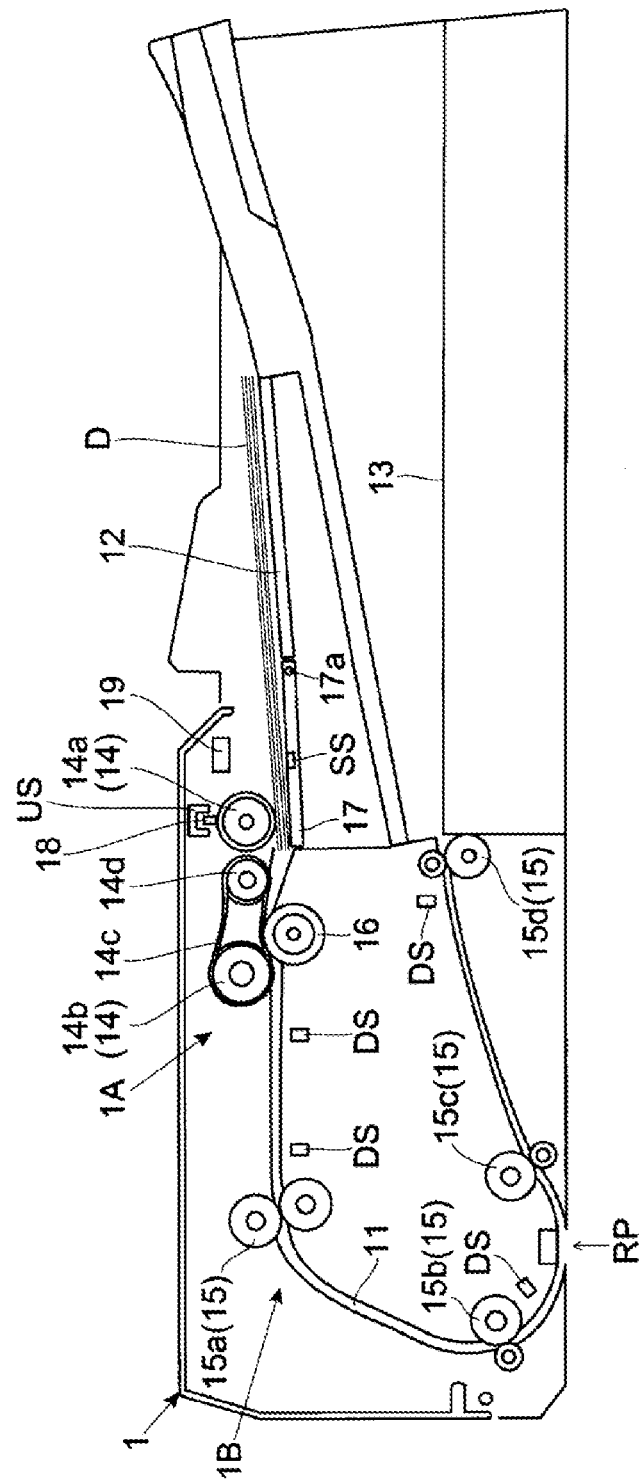
FIG. 2 is a diagram illustrating the document feeder according to the embodiment of the present disclosure.

As illustrated in FIG. 2, the document feeder 1 includes a document conveyance path 11 along which a document sheet D is conveyed to a reading point RP of the image reading section 2. The reading point RP of the image reading section 2 is located opposite to the sub contact glass G2. The document feeder 1 feeds a document sheet D set on a document setting tray 12 to the document conveyance path 11 and conveys the document sheet D along the document conveyance path 11. In conveyance reading, a document sheet D conveyed along the document conveyance path 11 passes over the reading point RP. During the time when the document sheet D passes over the reading point RP, the image reading section 2 reads the document sheet D. After being read, the document sheet D is subsequently conveyed along the document conveyance path 11 and finally ejected onto a document exit tray 13. In this manner, the document feeder 1 feeds the document sheet D to the document conveyance path 11 and conveys the document sheet D along the document conveyance path 11. The document feeder 1 includes a sheet feed section 1A and a document conveyance section 1B. The sheet feed section 1A includes a plurality of rotors 14 for performing a document feeding operating. The document conveyance section 1B includes a plurality of rotors 15 for performing a document conveyance operation.

The sheet feed section 1A includes a pickup roller 14a and a drive roller 14b among the rotors 14. The sheet feed section 1A further includes a feed belt 14c and a driven roller 14d. These elements of the sheet feed section 1A are unitized. The sheet feed section 1A is disposed at an upstream end of the document conveyance path 11 in terms of a document conveyance direction.

The pickup roller 14a rotates while in contact with a document sheet D set on the document setting tray 12 to draw out the document sheet D from the document setting tray 12. The feed belt 14c is wound around the drive roller 14b and driven roller 14d. Rotation of the drive roller 14b circulates the feed belt 14c. In the above configuration, when the document sheet D drawn out from the document setting tray 12 comes in contact with the feed belt 14c, the document sheet D is fed to the document conveyance path 11.

A separation roller 16 is disposed opposite to the feed belt 14c with the document conveyance path 11 therebetween. During circulation of the feed belt 14c, the separation roller 16 rotates so that the document sheet D returns upstream of the separation roller 16 in terms of the document conveyance direction. As a result, in a situation in which a plurality of document sheets D are drawn out from the document setting tray 12 in a layered manner, a topmost document sheet D among the plurality of document sheets D comes in contact with the feed belt 14c and is fed downstream of the feed belt 14c in terms of the document conveyance direction by the feed belt 14c. By contrast, any document sheet D under the topmost document sheet D (document sheet D on the side of the separation roller 16) is returned upstream of the separation roller 16 in terms of the document conveyance direction or made to remain there by the separation roller 16. The configuration as above can separate the plurality of layered document sheets D.

The rotors 15 of the document conveyance section 1B include two rollers of a registration roller pair 15a, two rollers of a first conveyance roller pair 15b, two rollers of a second conveyance roller pair 15c, and two rollers of a third conveyance roller pair 15d. The registration roller pair 15a is located downstream of the sheet feed section 1A in terms of the document conveyance direction. The registration roller pair 15a is located upstream of the first to third conveyance roller pairs 15b-15d in terms of the document conveyance direction. The registration roller pair 15a corrects skewed running of a document sheet D in a manner to temporarily stop and flex the document sheet D. The first to third conveyance roller pairs 15b-15d are disposed in stated order from upstream to downstream in terms of the document conveyance direction. The first to third conveyance roller pairs 15b-15d convey the document sheet D fed from the registration roller pair 15a to the reading point RP and then eject the document sheet D onto the document exit tray 13.

The document setting tray 12 has a downstream end portion in terms of the document conveyance direction (i.e., a portion on which a leading edge part of a document sheet D is loaded) that serves as a lift plate 17 capable of ascending and descending. The lift plate 17 is located opposite to the pickup roller 14a in a vertical direction. The lift plate 17 pivots on a turning shaft 17a. The turning shaft 17a is disposed at an upstream end part of the lift plate 17 in terms of the document conveyance direction. The lift plate 17 turns such that a downstream end part of the lift plate 17 in terms of the document conveyance direction swings vertically. That is, the downstream end part of the lift plate 17 in terms of the document conveyance direction ascends and descends. When the lift plate 17 (the downstream end part of the lift plate 17 in terms of the document conveyance direction) ascends, the lift plate 17 moves closer to the pickup roller 14*a*. In reverse, when the lift plate 17 (the downstream end part of the lift plate 17 in terms of the document conveyance direction) descends, the lift plate 17 moves away from the pickup roller 14*a*.

Figure 3:
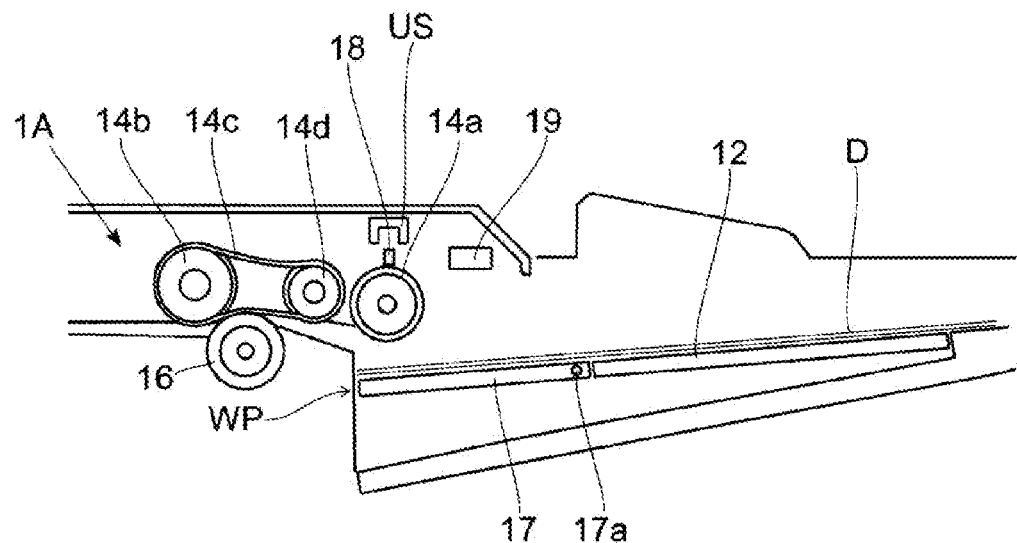
FIG. 3 is a diagram illustrating a state in which a lift plate waits at a standby position according to the embodiment of the present disclosure.
Figure 4:
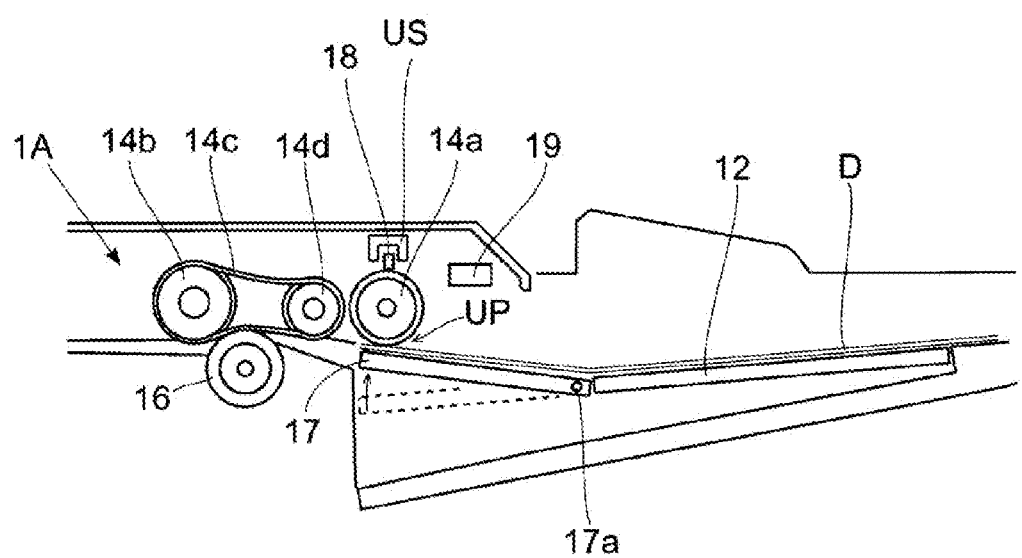
FIG. 4 is a diagram illustrating a state in which the lift plate lifts a topmost part of a document sheaf up to a feeding position according to the embodiment of the present disclosure.

The lift plate 17 waits for loading of a document sheaf of one or more document sheets D at a predetermined standby position WP, as illustrated in FIG. 3. During the time when the lift plate 17 waits at the standby position WP, the distance between the lift plate 17 and the pickup roller 14*a* is at a maximum. By contrast, once the multifunction peripheral 100 receives an instruction to execute a job involving document conveyance, such as a copy job, the lift plate 17 starts ascending to lift up the document sheaf loaded on the lift plate 17, as illustrated in FIG. 4. The document sheaf accordingly arrives at a predetermined feed position UP. Further, lifting up the document sheaf causes the document sheaf to come in contact with and pushes up the pickup roller 14*a*. When the document sheaf arrives at the feed position UP, the lift plate 17 stop ascending. Thereafter, the sheet feed section 1A performs the document conveyance operation in a state in which the document sheaf is in contact with the pickup roller 14*a*, that is, in a state in which the document sheaf is lifted up to the feed position UP.

In order to determine whether or not the document sheaf loaded on the lift plate 17 arrives at the feed position UP, an upper limit sensor US is disposed above the pickup roller 14*a*. For example, the upper limit sensor US may be a transmission photo sensor including a light emitter and a light receiver. In a configuration in which a transmission photo sensor is employed as the upper limit sensor US, for example, a detection target piece 18 that is pushed up together with the pickup roller 14*a* is disposed in the document feeder 1 as a detection target of the upper limit sensor US. In the absence of a document sheaf at the feed position UP, the detection target piece 18 is located away from a light path between the light emitter and the light receiver, which is a detection region of the upper limit sensor US (see FIG. 3). By contrast, when a document sheaf is lifted up, the detection target piece 18 is pushed up together with the pickup roller 14*a*. Once the document sheaf arrives at the feed position UP, the detection target piece 18 blocks the detection region of the upper limit sensor US (see FIG. 4). In the configuration as above, the upper limit sensor US changes an output value thereof between in a state in which a document sheaf arrives at the feed position UP and in a state in which it does not arrive at the feed position UP.

Further, a sheet type detection section 19, which may be called a media sensor, is disposed above the lift plate 17. The sheet type detection section 19 detects a sheet type of document sheets D in a document sheaf loaded on the lift plate 17. For example, the sheet type detection section 19 may include an image sensor, a control IC, etc. Once the multifunction peripheral 100 receives an instruction to execute a job involving document conveyance, in other words, when the lift plate 17 starts ascending, the sheet type detection section 19 images a document sheaf loaded on the lift plate 17 and detects the sheet type of the document sheets D in the document sheaf loaded on the lift plate 17 based on the imaged data. Note that the sheet type detection section 19 may include a sensor that irradiates a document sheaf with light, obtains a reflectivity or transmittance of the document sheaf based on reflected light from the document sheaf, and detects a sheet type of the document sheets D in the document sheaf based on the obtained reflectivity or transmittance. Alternatively, the sheet type detection section 19 may include a sensor that irradiates a document sheaf with light and detects a sheet type of the document sheets D in the document sheaf based on the wavelength of reflected light from the document sheaf. Note that the number of sheet type detection sections 19 is not limited specifically and may be one or more. In a configuration with a plurality of sheet type detection sections 19, the sheet type detection sections 19 are arranged, for example, in a direction perpendicular to the document conveyance direction, that is, the direction perpendicular to the plane of FIG. 2.

The document feeder 1 further includes a loading sensor SS for detecting loading of a document sheaf on the lift plate 17, as illustrated in FIG. 2. The loading sensor SS may be a transmission photo sensor including a light emitter and a light receiver, for example. In a configuration in which a transmission photo sensor is employed as the loading sensor SS, an actuator (herein after referred to as a first actuator) protruding in a document loading region is disposed in the document feeder 1 as a detection target of the loading sensor SS, for example. Once a document sheaf is loaded on the lift plate 17, the first actuator is pushed downward by the document sheaf. The first actuator accordingly blocks or opens a light path between the light emitter and the light receiver, which is a detection region of the loading sensor SS. By contrast, in the absence of a document sheaf on the lift plate 17, no document sheaf pushes the first actuator. As a result, the first actuator moves upward. In the configuration as above, the first actuator opens or blocks the detection region of the loading sensor SS. Accordingly, the loading sensor SS changes an output value thereof between in a state in which a document sheaf is loaded on the lift plate 17 and in a state in which a document sheaf is not loaded on the lift plate 17.

The document feeder 1 further includes a plurality of document sensors DS that detects the presence of a document sheet D or times document conveyance. Any of the document sensors DS may be a transmission photo sensor including a light emitter and a light receiver, for example. In a configuration in which a transmission photo sensor is employed as any of the document sensors DS, an actuator (hereinafter referred to as a second actuator) protruding into the document conveyance path 11 at a given detection point is provided in the document feeder 1 as a detection target of the document sensor DS, for example. Once the leading edge of a document sheet D arrives at the detection point, the second actuator is pushed by the document sheet D to be rotated, thereby being in a laid state, for example. In such a configuration, during the time when the document sheet D passes over the detection point, the document sheet D is in contact with the second actuator to continuously lay the second actuator. After the rear edge of the document sheet D passes over the detection point, the document sheet D is out of contact with the second actuator, so that the second actuator returns to the original state from the laid state. Accordingly, the document sensor DS changes an output value thereof between in a state in which a document sheet D is present at the detection point and in a state in which a document sheet D is not present at the detection point.

Returning to FIG. 1, the document feeder 1 includes an operation panel 8, which corresponds to an operation display section in the present disclosure. The operation panel 8 includes a display panel 81 with a touch panel. The display panel 81 displays information about a state of the document feeder 1. Further, the display panel 81 displays soft keys to receive various settings for the document feeder 1. The operation panel 8 further includes various hard keys 82. Example of the hard keys 82 may include a start key for receiving an instruction to execute a job involving document conveyance. Note that the operation panel 8 also displays information about respective states of the image reading section 2 and the printing section 3. The operation panel 8 also receives various settings for the image reading section 2 and the printing section 3. That is, the operation panel 8 is not dedicated to the document feeder 1.

Hardware Configuration of Multifunction Peripheral

Figure 5:
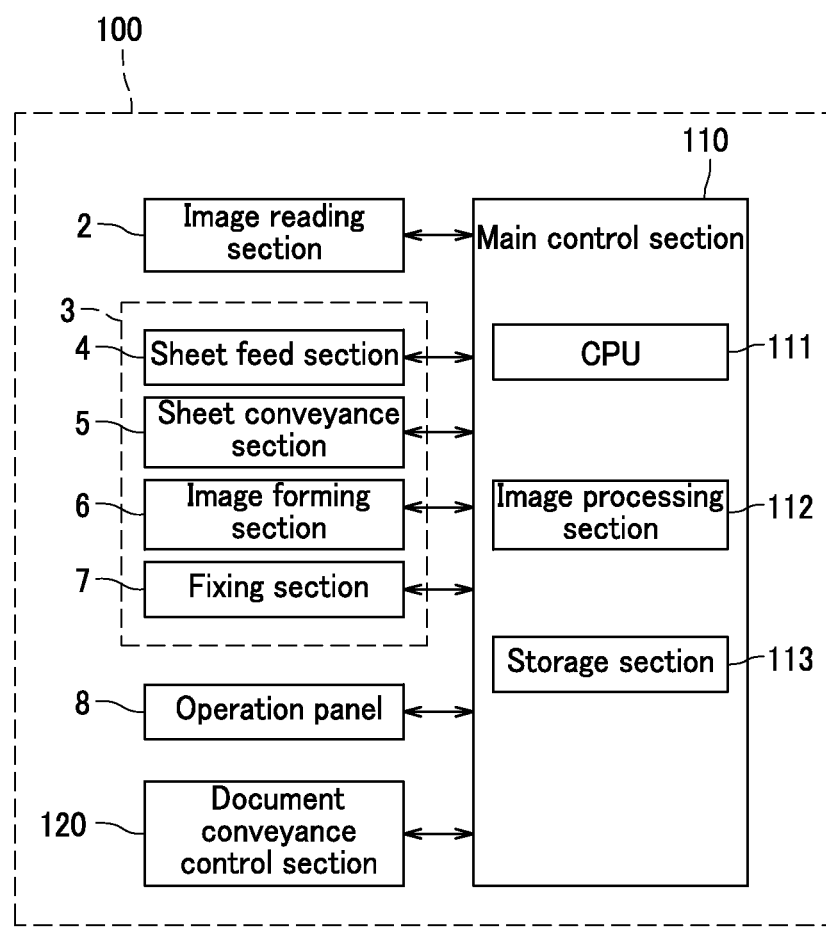
FIG. 5 is a block diagram illustrating a hardware configuration of the multifunction peripheral including the document feeder according to the embodiment of the present disclosure.

As illustrated in FIG. 5, the multifunction peripheral 100 includes a main control section 110. The main control section 110 includes a CPU 111, an image processing section 112, and a storage section 113. The image processing section 112 includes an ASIC dedicated to image processing, etc. The image processing section 112 performs image processing including zooming, density conversion, data type conversion, and the like on image data. The storage section 113 includes a ROM, a RAM, etc. The storage section 113 stores programs and data for control. The main control section 110 controls operation of the multifunction peripheral 100 based on the programs and the data stored in the storage section 113.

Specifically, the main control section 110 is connected to the image reading section 2 and the printing section 3 including the sheet feed section 4, the sheet conveyance section 5, the image forming section 6, and the fixing section 7, and controls a reading operation and a printing operation. The main control section 110 is further connected to the operation panel 8 and detects an operation that the operation panel 8 receives. The main control section 110 further controls a display operation by the operation panel 8, and the like. The main control section 110 is further connected to the document conveyance control section 120, which corresponds to a control section in the present disclosure, and provides an instruction for control on the document feeder 1 to the document conveyance control section 120.

Figure 6:
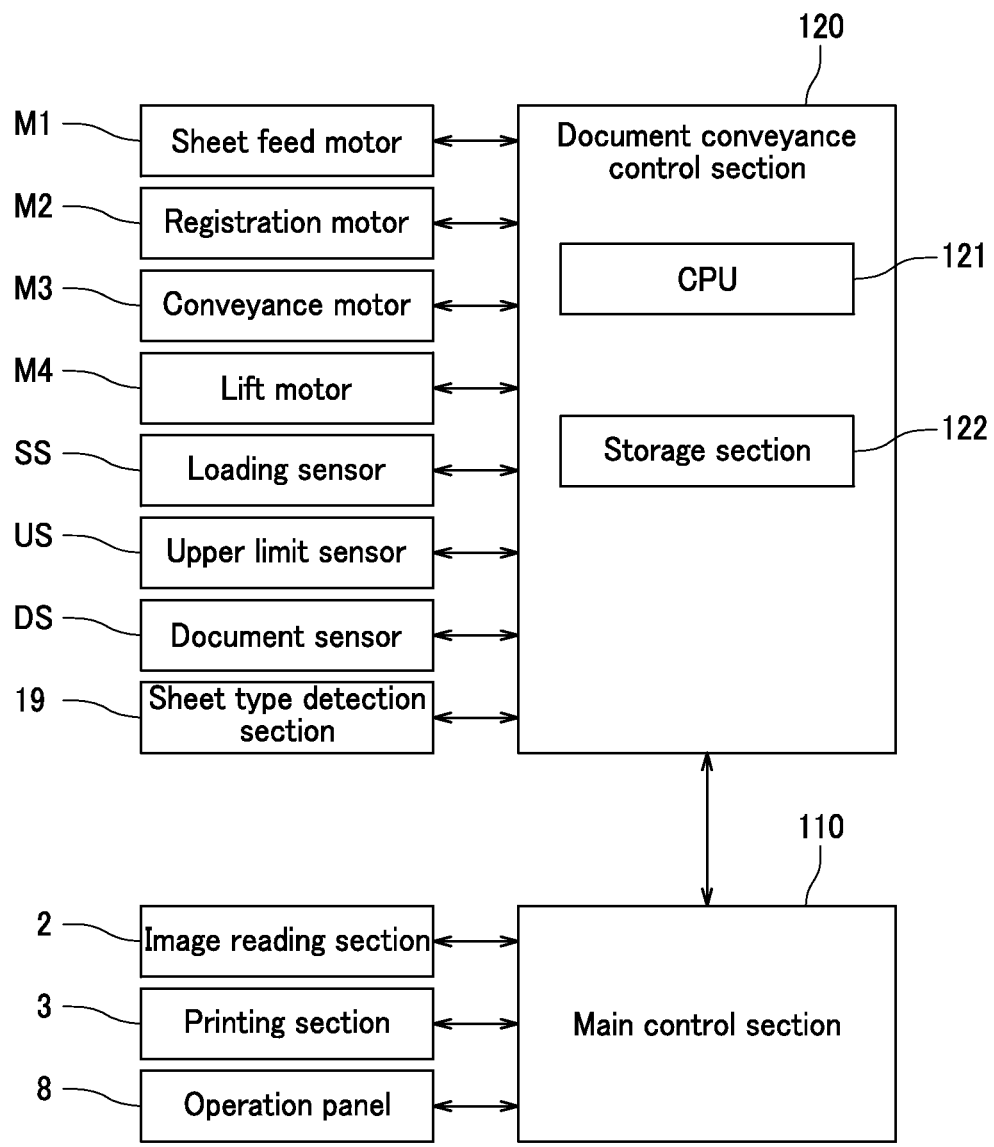
FIG. 6 is a block diagram illustrating a hardware configuration of the document feeder according to the embodiment of the present disclosure.

The document conveyance control section 120 includes a CPU 121 and a storage section 122, as illustrated in FIG. 6. The document conveyance control section 120 receives an instruction from the main control section 110 and controls the operation of the document feeder 1.

In order to control the operation of the document feeder 1, the document conveyance control section 120 is connected to a sheet feed motor M1, a registration motor M2, and a conveyance motor M3. Specifically, the document conveyance control section 120 rotates and stops rotating respective rollers connected to the sheet feed motor M1, the registration motor M2, and the conveyance motor M3. Note that the sheet feed motor M1 rotates the pickup roller 14a and the drive roller 14b. The registration motor M2 rotates the registration roller pair 15a. The conveyance motor M3 rotates the first to third conveyance roller pairs 15b-15d.

The document conveyance control section 120 is further connected to a lift motor M4 and controls driving of the lift motor M4. Drive power of the lift motor M4 is transmitted to the lift plate 17. As such, driving the lift motor M4 lifts up and down the lift plate 17. In other words, the document conveyance control section 120 causes the lift plate 17 to ascend and descend. Note that the lift motor M4 may be a stepping motor. In a configuration in which a stepping motor is employed as the lift motor M4, a travel amount of the lift plate 17 in the vertical direction varies depending on the number of drive pulses of the stepping motor, that is, the lift motor M4. Hereinafter, the lift motor M4 may be referred to as a stepping motor M4.

The document conveyance control section 120 determines whether or not a document sheaf is loaded on the lift plate 17 according to an output value of the loading sensor SS. Upon determining that a document sheaf is loaded on the lift plate 17 when an instruction to execute a job involving document conveyance is received, the document conveyance control section 120 causes the lift plate 17 to start ascending. In other words, the document conveyance control section 120 causes the lift motor M4 to start driving.

The document conveyance control section 120 further determines according to an output value of the upper limit sensor US whether or not the document sheaf loaded on the lift plate 17 arrives at the feed position UP. When it is detected that the document sheaf loaded on the lift plate 17 arrives at the feed position UP, the document conveyance control section 120 causes the lift plate to stop ascending. In other words, the document conveyance control section 120 causes the lift motor M4 to stop driving.

The document conveyance control section 120 is further connected to the sheet type detection section 19. The document conveyance control section 120 obtains information indicating a sheet type of the document sheets D in the document sheaf loaded on the lift plate 17 from the sheet type detection section 19. Note that although described later in detail, the information indicating a sheet type of one or more document sheets D in a document sheaf is used for determining the number of document sheets D in the document sheaf loaded on the lift plate 17.

The document conveyance control section 120 also detects arrival of the leading edge and passing of the rear edge of a document sheet D at the detection points according to respective output values of the document sensors DS. On the basis of the detection results, the document conveyance control section 120 determines whether or not a jam (sheet jam) occurs.

In order to determine whether or not a jam occurs, the document conveyance control section 120 starts clocking from detection of arrival of the leading edge of a document sheet D at a detection point of a given one of the document sensors DS (hereinafter referred to as a first sensor). When a predetermined time period (hereinafter referred to as a first predetermined time period) elapses from detection of the arrival of the leading edge of a document sheet D at the detection point of the first sensor, the document conveyance control section 120 then determines whether or not the leading edge of the document sheet D arrives at a detection point of another document sensor (hereinafter referred to as a second sensor) located downstream of the first sensor in terms of the document conveyance direction. When no arrival of the leading edge of the document sheet D is detected at the detection point of the second sensor, as a result, the document conveyance control section 120 determines that a jam occurs. The first predetermined time period is a time period necessary for a document sheet D to proceed from the detection point of the first sensor to the detection point of the second sensor. The first predetermined time period can be calculated in advance based on a document conveyance speed and a distance between the detection points of the first and second sensors.

Alternatively, when passing of the rear edge of a document sheet D is not detected at a detection point of a given one of the document sensors DS even after a predetermined time period (hereinafter referred to as a second time period) elapses from detection of arrival of the leading edge of the document sheet D at the same detection point, the document conveyance control section 120 determines that a jam occurs. The second predetermined time period is a necessary time period from arrival of the leading edge to passing of the rear edge of a document sheet D at a detection point of a given document sensor. The second predetermined time period can be calculated in advance based on document size (length thereof in the document conveyance direction) and a document conveyance speed.

Excess Sheet Number Determination

In a situation in which the thickness of a document sheaf loaded on the lift plate 17 (total value of respective thicknesses of one or more document sheets D included in the document sheaf) is too large, in other words, too many document sheets D are set between the lift plate 17 and the pickup roller 14a, pressure (sheet feed pressure) between the pickup roller 14a and the document sheets D may become too high. In such a situation, the pickup roller 14a is likely to slip in feeding a document sheet D to the document conveyance path. In other words, sheet slipping is likely to occur. Sheet slipping may be one of factors that cause a state in which no document sheet is fed to the document conveyance path, which may be called non-feed jam.

For this reason, a maximum limit of the number of document sheets D loadable on the lift plate 17 is preset in advance. Hereinafter, a maximum limit of the number of document sheets D loadable on the lift plate 17 is referred to as a maximum sheet number. The maximum sheet number is determined in advance on a sheet type basis so that the thickness of a document sheaf loaded on the lift plate 17 does not exceed a predetermined maximum thickness. The storage section 113 stores such a preset maximum sheet number for each of one or more sheet types.

The maximum thickness can be obtained by calculating, for example, the thickness of a document sheaf loaded on the lift plate 17 in a situation in which the document sheaf has a large enough thickness to make occurrence of a non-feed jam likely. Specifically, the thickness of a document sheaf in a situation in which a non-feed jam is likely to occur is obtained as the maximum thickness. Alternatively, a thickness that is a predetermined amount less than the thickness of a document sheaf in a situation in which a non-feed jam is likely to occur may be obtained as the maximum thickness. The maximum sheet number is the number of document sheets D in a document sheaf in a situation in which the thickness of the document sheaf is equal to the maximum thickness. Note that document sheets D having various sheet thicknesses, both thin and thick, may be conveyed. For this reason, the maximum sheet number depends on a sheet type. Specifically, the thicker the sheet thickness is, the smaller the maximum sheet number is. The thinner the sheet thickness is, the greater the maximum sheet number is.

A user may load a number of document sheets D on the lift plate 17 that exceeds the maximum sheet number. A non-feed jam is likely to occur in such a situation. Therefore, it is preferable to notify the user that the number of the document sheets D loaded on the lift plate 17 exceeds the maximum sheet number. The document conveyance control section 120 determines whether or not the number of document sheets D loaded on the lift plate 17 exceeds the maximum sheet number. Hereinafter, the determination may be referred to as excess sheet number determination.

Figure 7A:
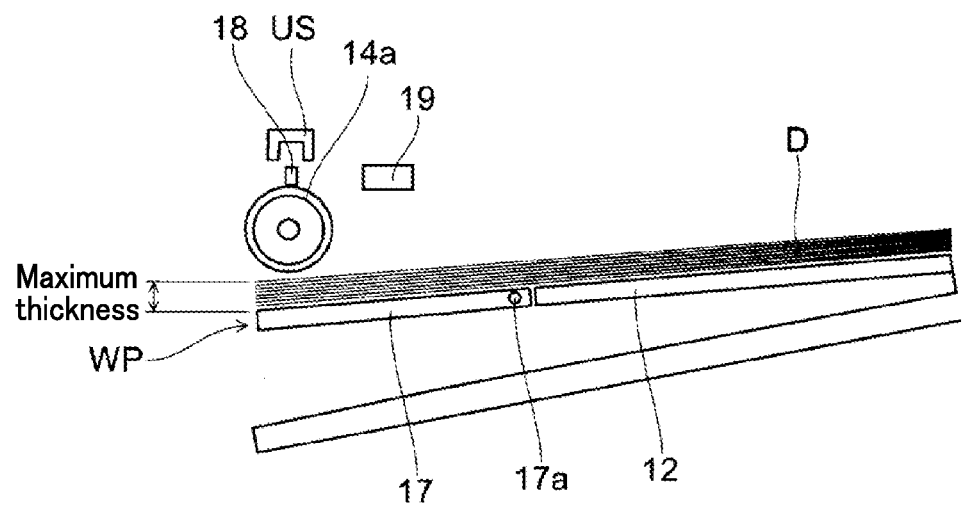
FIG. 7A is a diagram illustrating a state in which a document sheaf having a maximum thickness is loaded on the lift plate according to the embodiment of the present disclosure.
Figure 7B:
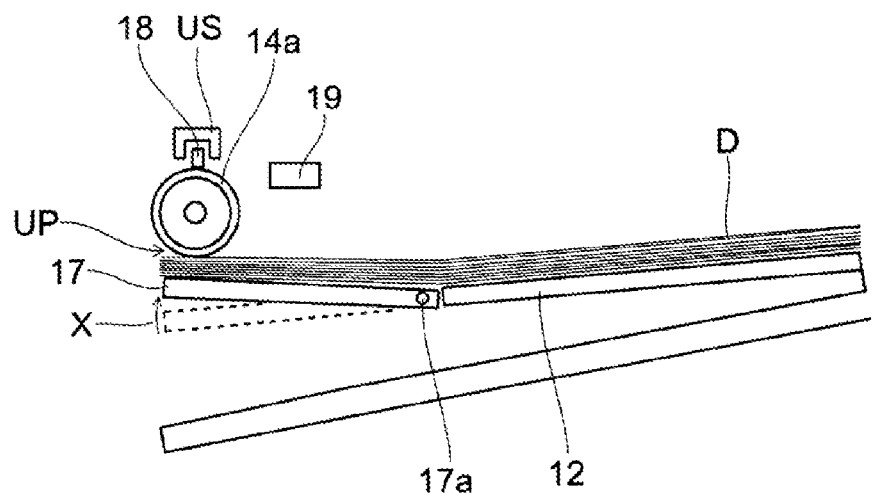
FIG. 7B is a diagram indicating a travel amount of the lift plate when the document sheaf having the maximum thickness is loaded on the lift plate according to the embodiment of the present disclosure.

In order to enable the document conveyance control section 120 to perform the excess sheet number determination, a threshold amount to be used as a determination reference in the excess sheet number determination is determined in advance and stored in the storage section 122. Referring to FIGS. 7A and 7B, the storage section 122 stores as a threshold amount, for example, the number of drive pulses of the stepping motor M4 (travel amount of the lift plate 17) necessary for the lift plate 17 to cause a topmost part of a document sheaf loaded on the lift plate 17 to arrive at the feed position UP in a situation in which the document sheaf has the maximum permitted thickness. The number of the drive pulses (threshold amount) corresponds to a first travel amount in the present disclosure and is hereinafter referred to as a threshold pulse number.

Figure 8A:
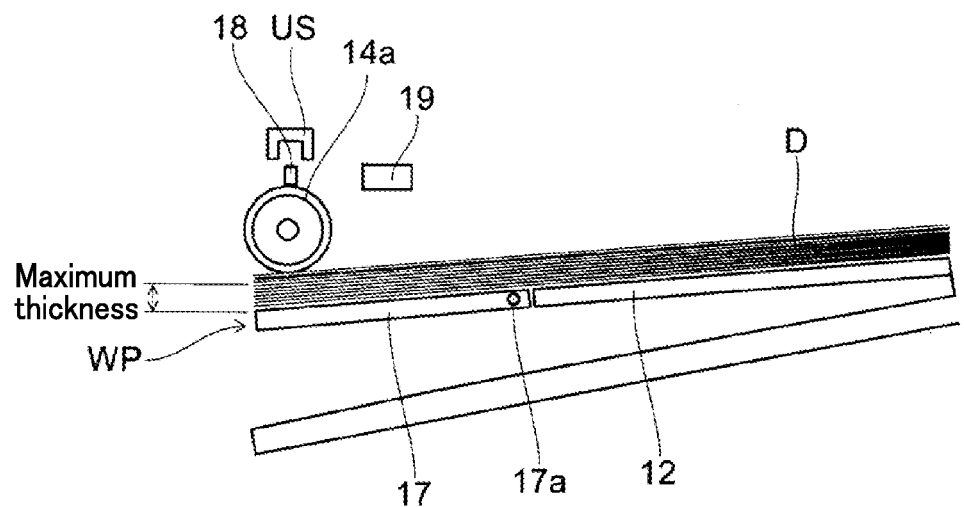
FIG. 8A is a diagram illustrating a state in which a document sheaf having a thickness exceeding the maximum thickness is loaded on the lift plate according to the embodiment of the present disclosure.
Figure 8B:
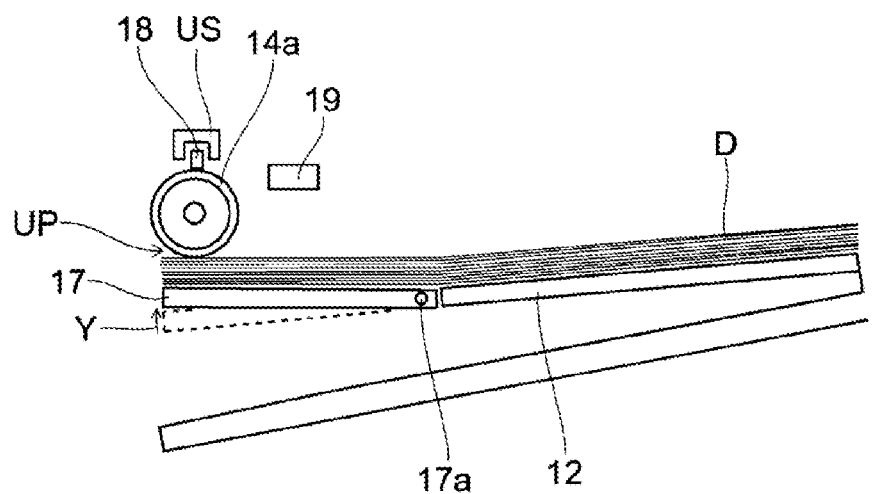
FIG. 8B is a diagram indicating a travel amount of the lift plate when the document sheaf having the thickness exceeding the maximum thickness is loaded on the lift plate according to the embodiment of the present disclosure.

As illustrated in FIGS. 8A and 8B, in a situation in which the thickness of a document sheaf loaded on the lift plate 17 exceeds the maximum thickness, a travel amount Y of the lift plate 17 taken to cause the topmost part of the document sheaf to arrive at the feed position UP is less than the threshold amount (first travel amount). In other words, the travel amount Y of the lift plate 17 is less than a travel amount X (first travel amount) of the lift plate 17 in a situation in which the thickness of a document sheaf loaded on the lift plate 17 is equal to the maximum thickness (in a situation illustrated in FIGS. 7A and 7B). Accordingly, the number of the drive pulses of the stepping motor M4 taken to cause the topmost part of the document sheaf to arrive at the feed position UP is less than the threshold pulse number.

The document conveyance control section 120 obtains the number of the drive pulses of the stepping motor M4 (travel amount of the lift plate 17) taken to cause the topmost part of the document sheaf to arrive at the feed position UP from a start of ascension of the lift plate 17 from the standby position WP. The number of the drive pulses of the stepping motor M4 obtained as above corresponds to a second travel amount in the present disclosure and is hereinafter referred to as an actual pulse number. The document conveyance control section 120 performs the excess sheet number determination using the threshold pulse number and the actual pulse number. Specifically, the document conveyance control section 120 compares the threshold pulse number with the actual pulse number. When the comparison results in that the actual pulse number is less than the threshold pulse number, the document conveyance control section 120 determines that the number of the document sheets D in the document sheaf loaded on the lift plate 17 exceeds the maximum sheet number. By contrast, when the comparison results in that the actual pulse number is not less than the threshold pulse number, the document conveyance control section 120 determines that the number of the document sheets D in the document sheaf loaded on the lift plate 17 does not exceed the maximum sheet number.

While causing the lift plate 17 to ascend, the document conveyance control section 120 further causes the sheet type detection section 19 to detect a sheet type of the document sheets D in the document sheaf loaded on the lift plate 17. Thus, the document conveyance control section 120 obtains a result of sheet type detection by the sheet type detection section 19. Subsequently, the document conveyance control section 120 determines the sheet thickness of each of the document sheets D in the document sheaf loaded on the lift plate 17 based on the result of sheet type detection by the sheet type detection section 19. The storage section 122 stores a preset sheet thickness for each of one or more sheet types.

When the actual pulse number is less than the threshold pulse number at determination of the document sheaf (the topmost part of the document sheaf) arriving at the feed position UP, the document conveyance control section 120 obtains an excess thickness of the document sheaf loaded on the lift plate 17 over the maximum thickness according to the threshold pulse number and the actual pulse number. In other words, when it is determined that the number of the document sheets D in the document sheaf loaded on the lift plate 17 exceeds the maximum sheet number, an excess thickness is obtained. For example, the document conveyance control section 120 calculates a pulse number by subtracting the actual pulse number from the threshold pulse number, and obtains an excess thickness according to the calculated pulse number, which may be hereinafter referred to as a differential pulse number. The differential pulse number is a value that indicates how small the travel amount of the lift plate 17 until the document sheaf (the topmost part of the document sheaf) arrives at the feed position UP is in comparison with the threshold amount. In other words, the differential pulse number corresponds to a value indicating how large the thickness of the document sheaf loaded on the lift plate 17 is in comparison with the maximum thickness.

After obtaining the excess thickness, the document conveyance control section 120 obtains an excess number of the document sheets D of the document sheaf loaded on the lift plate 17 over the maximum sheet number according to the excess thickness and the sheet thickness corresponding to the sheet type detected by the sheet type detection section 19. For example, the document conveyance control section 120 obtains an excess number by dividing the excess thickness by a sheet thickness preset for the sheet type detected by the sheet type detection section 19.

Information Screen

Upon determining that the number of the document sheets D in the document sheaf loaded on the lift plate 17 exceeds the maximum sheet number, the document conveyance control section 120 notifies the main control section 110 of the result of the excess sheet number determination including the excess number. In response to receipt of the notification, the main control section 110 causes the operation panel 8 to notify that the number of the document sheets D in the document sheaf loaded on the lift plate 17 exceeds the maximum sheet number.

Figure 9:
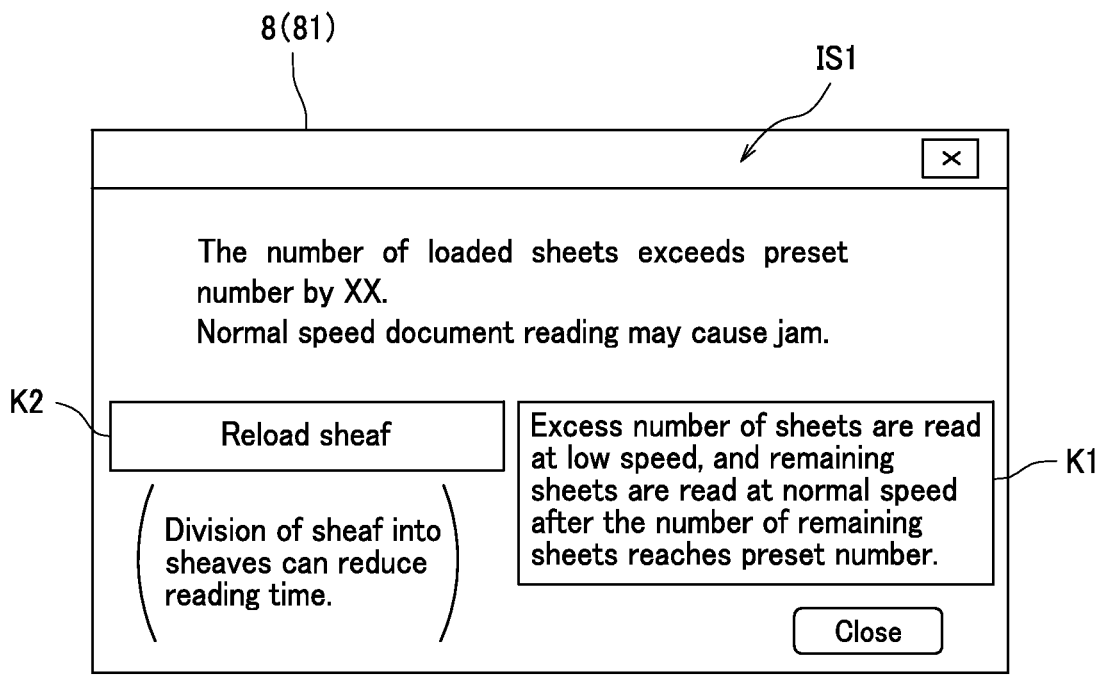
FIG. 9 is a diagram illustrating a first information screen displayed in a situation in which document sheets of which the number exceeds a maximum sheet number are loaded on the lift plate according to the embodiment of the present disclosure.

During notification, the operation panel 8 displays an information screen IS1 as illustrated in FIG. 9. On the information screen IS1, information is provided that indicates that the number of the document sheets D in the document sheaf loaded on the lift plate 17 exceeds the maximum sheet number. In the present embodiment, a text message indicating that the number of the document sheets D in the document sheaf loaded on the lift plate 17 exceeds the maximum sheet number is provided on the information screen IS1. Information indicating the excess number, which is expressed as XX in FIG. 9, is provided on the information screen IS1. Specifically, a text massage indicating the excess number is provided on the information screen IS1. In this manner, various information (text massages) is provided on the information screen IS1. In a situation in which the number of the document sheets D in the document sheaf loaded on the lift plate 17 exceeds the maximum sheet number, a jam is likely to occur. In the present embodiment, in a situation in which the number of the document sheets D in the document sheaf loaded on the lift plate 17 exceeds the maximum sheet number, information (text message) for notifying that a jam is likely to occur is also provided on the information screen IS1.

Incidentally, even in a situation in which the number of the document sheets D in a document sheaf loaded on the lift plate 17 exceeds the maximum sheet number, in other words, a non-feed jam is likely to occur, decrease in rotational speed of the pickup roller 14a from a normal speed can make it less likely that the pickup roller 14a will slip. A non-feed jam is accordingly less likely to occur. In view of the foregoing, the document feeder 1 in the present embodiment adopts a normal mode and a special mode that is for reducing occurrence of a non-feed jam, as modes pertaining to document conveyance (document conveyance modes). In the normal mode, a document sheet D is conveyed at a predetermined speed. In the special mode, a document sheet D is conveyed at a speed lower than that in the normal mode. That is, in the special mode, the respective rotors 14 (respective rollers) in the sheet feed section 1A and the respective rotors 15 (respective rollers) in the document conveyance section 1B rotate at a speed lower than that in the normal mode. Hereinafter, the rotors 14 may be referred to as rollers 14. Also, the rotors 15 may be referred to as rollers 15.

When the respective rollers 14 in the sheet feed section 1A and the respective rollers 15 in the document conveyance section 1B rotate at a low speed, a time period (conveyance time period) becomes long from a start to an end of a job involving document conveyance. For this reason, in document conveyance in the special mode in the present embodiment, each of the rollers 14 in the sheet feed section 1A and each of the rollers 15 in the document conveyance section 1B rotate at a low speed only during conveyance of an excess number of document sheets D in a document sheaf. Each of the rollers 14 in the sheet feed section 1A and each of the rollers 15 in the document conveyance section 1B then rotate at the normal speed after the excess number of document sheets D are conveyed. In other words, the document conveyance speed is low only in a situation in which the number of the document sheets D in the document sheaf loaded on the lift plate 17 exceeds the maximum sheet number (in a situation in which a non-feed jam is likely to occur).

For example, the document conveyance control section 120 counts the number of document sheets D fed to the document conveyance path 11 based on a value output from a document sensor DS disposed the most upstream in terms of the document conveyance direction, which may be hereinafter referred to as a most upstream document sensor DS, among the document sensors DS. In the configuration as above, the document conveyance control section 120 counts the number of document sheets D conveyed at the low speed. Specifically, the document conveyance control section 120 detects arrival of the leading edge and passing of the rear edge of a document sheet D at the detection point of the most upstream document sensor DS based on an output value of the most upstream document sensor DS to count the number of document sheets D fed to the document conveyance path 11. After the last document sheet D among the excess number of document sheets D passes over the reading point RP, the document conveyance control section 120 then returns the document conveyance speed to the normal speed from the low speed. In the configuration as above, the normal speed is set as the document conveyance speed for any document sheet D subsequent to the last document sheet D among the excess number of document sheets D.

The operation panel 8 receives an instruction as to whether or not to execute document conveyance in the special mode. For example, while displaying the information screen IS1, the operation panel 8 provides a soft key K1 on the information screen IS1 for receiving an instruction to execute document conveyance in the special mode. When the soft key K1 receives a touch, the document conveyance control section 120 causes a document feeding operation by the sheet feed section 1A and a document conveyance operation by the document conveyance section 1B in the special mode.

Alternatively, in a situation in which the number of the document sheets D in the document sheaf loaded on the lift plate 17 exceeds the maximum sheet number, a state in which a non-feed jam is likely to occur can be resolved by reloading the to-be-conveyed document sheaf after being divided into a plurality of sheaves so that the number of document sheets D included in each of the sheaves does not exceed the maximum sheet number and the respective sheaves are set (reloaded) on the document setting tray 12 in succession. In addition, in a situation in which the to-be-conveyed document sheaf is divided into a plurality of sheaves as above, it is unnecessary to convey the document sheets D in the special mode. Accordingly, the time period for conveyance may have a lower tendency to be lengthened than in a situation in which document conveyance in the special mode is performed. In other words, the time period for conveyance can be reduced.

While displaying the information screen IS1, the operation panel 8 receives input indicating as to whether or not the document sheets D are to be reloaded in the present embodiment. For example, the operation panel 8 provides a soft key K2 on the information screen IS1 for receiving input indicating reloading of the document sheaf, in addition to the soft key K1. The operation panel 8 further provides information (a text message) on the information screen IS for notifying that division of the to-be-conveyed document sheaf into a plurality of sheaves can reduce a conveyance time period (reading time period). In response to the soft key K2 receiving a touch, the document conveyance control section 120 causes the lift plate 17 to descend toward the standby position WP. The configuration as above can allow the document sheaf to be reloaded. The document conveyance control section 120 causes the document sheets D reloaded after being divided into sheaves to be conveyed in the normal mode.

Still further in a situation in which the number of document sheets D in a document sheaf loaded on the lift plate 17 exceeds the maximum sheet number by an excessively large number of document sheets D, the pickup roller 14a may slip even at a reduced document conveyance speed, thereby disabling document feeding to the document conveyance path 11. In the present embodiment, the document conveyance control section 120 determines whether or not the actual pulse number is less than the threshold pulse number by a predetermined pulse number (predetermined amount) or more. In other words, the document conveyance control section 120 determines whether or not the thickness of a document sheaf loaded on the lift plate 17 is too thick to enable document feeding to the document conveyance path 11 even at a reduced document conveyance speed. Note that a method of obtaining the predetermined pulse number is not limited specifically. For example, the predetermined pulse number can be obtained based on the number of the drive pulses of the stepping motor M4 (travel amount of the lift plate 17) in a situation in which a document sheaf loaded on the lift plate 17 is so excessively thick as to disable document feeding to the document conveyance path 11 even at a reduced document conveyance speed.

Figure 10:
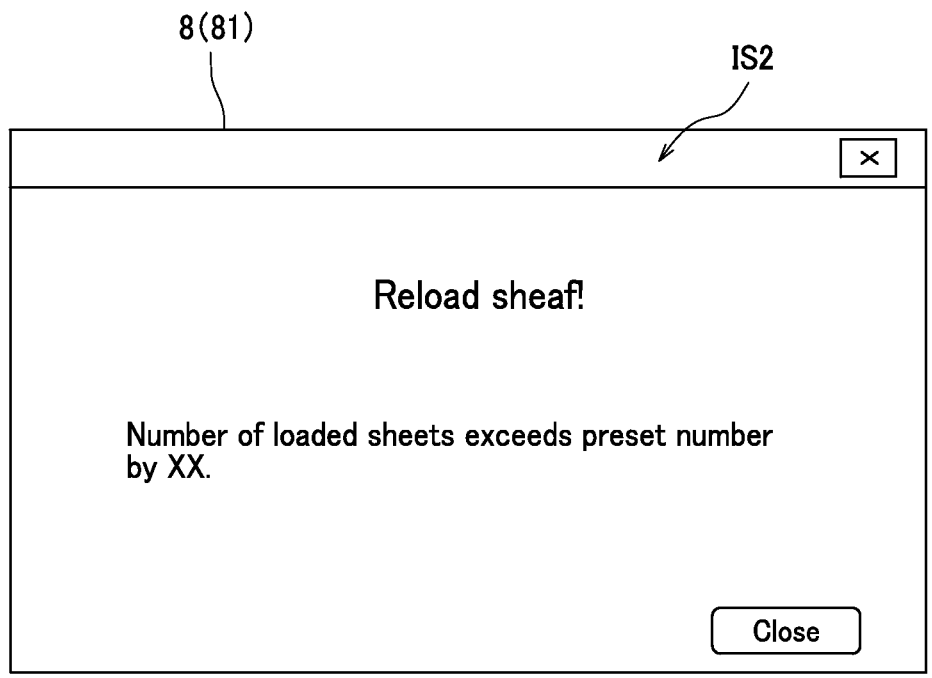
FIG. 10 is a diagram illustrating a second information screen displayed in a situation in which document sheets of which the number exceeds the maximum sheet number are loaded on the lift plate according to the embodiment of the present disclosure.

When determining that the actual pulse number is less than the threshold pulse number by the predetermined pulse number or more, the document conveyance control section 120 causes the sheet feed section 1A and the document conveyance section 1B not to perform the document feeding operation and the document conveyance operation, respectively. Further, in such a situation, the main control section 110 causes the operation panel 8 to display an information screen IS2 as illustrated in FIG. 10. For example, information (a text message) requesting reloading of the document sheets D is provided on the information screen IS2.

Control Flow in Response to Receipt of Instruction to Execute Job Involving Document Conveyance With reference to a flowchart illustrated in FIGS. 11 and 12, a control (process) flow will be described below that is executed in response to receipt of an instruction to execute a job involving document conveyance by the operation panel 8. Note that at a start point in the flowchart illustrated in FIG. 11, a document sheaf is loaded on the lift plate 17. In other words, one or more document sheets D are set on the document setting tray 12. In response to the operation panel 8 receiving an instruction to execute a job involving document conveyance in such a situation, the flow illustrated in FIGS. 11 and 12 starts.

At Step S1, the document conveyance control section 120 starts causing the lift plate 17 to ascend. Next at Step S2, the document conveyance control section 120 causes the sheet type detection section 19 to detect a sheet type of the document sheets D in the document sheaf loaded on the lift plate 17. At Step S3, the document conveyance control section 120 subsequently obtains a result of sheet type detection by the sheet type detection section 19 to determine the sheet type of the document sheets D in the document sheaf loaded on the lift plate 17. At Step S4, the document conveyance control section 120 then determines a sheet thickness corresponding to the determined sheet type.

At Step S5, the document conveyance control section 120 subsequently determines whether or not a topmost part of the document sheaf loaded on the lift plate 17 arrives at the feed position UP. When it is determined that the topmost part of the document sheaf loaded on the lift plate 17 arrives at the feed position UP (Yes at Step S5), the routine proceeds to Step S6. By contrast, when it is determined that the topmost part of the document sheaf loaded on the lift plate 17 does not arrive at the feed position UP (No at Step S5), the processing (determination) at Step S5 is repeated.

At Step S6, the document conveyance control section 120 detects an actual pulse number of the stepping motor M4 taken to cause the topmost part of the document sheaf to arrive at the feed position UP from a start of ascension of the lift plate 17 from the standby position WP. At Step S7, the document conveyance control section 120 then performs excess sheet number determination. That is, the document conveyance control section 120 determines whether or not the actual pulse number is less than the threshold pulse number. In other words, the document conveyance control section 120 determines whether or not the number of the document sheets D loaded on the lift plate 17 exceeds the maximum sheet number. When it is determined that the actual pulse number is less than the threshold pulse number (Yes at Step S7), that is, the number of the document sheets D exceeds the maximum sheet number, the routine proceeds to Step S8. At Step S8, the document conveyance control section 120 detects an excess number of the document sheets D loaded on the lift plate 17 over the maximum sheet number. Then, the routine proceeds to Step S9.

At Step S9, the document conveyance control section 120 determines whether or not the differential pulse number is not less than the predetermined pulse number. Specifically, the document conveyance control section 120 determines whether or not the actual pulse number is less than the threshold pulse number by the predetermined pulse number or more. When it is determined that the differential pulse number is less than the predetermined pulse number (No at Step S9), the routine proceeds to Step S10 in FIG. 12.

At Step S10, the main control section 110 causes the operation panel 8 to display the information screen IS1 (see FIG. 9). Then at Step S11, the main control section 110 determines whether or not the operation panel 8 receives an instruction for document conveyance in the special mode. When it is determined that the operation panel 8 receives an instruction for document conveyance in the special mode (Yes at Step S11), the routine proceeds to Step S12. At Step S12, the document conveyance control section 120 causes execution of document conveyance at a low speed (in the special mode).

At Step S13, the document conveyance control section 120 thereafter determines whether or not the number of conveyed document sheets D reaches the excess number. When it is determined that the number of conveyed document sheets D reaches the excess number (Yes at Step S13), the routine proceeds to Step S14. By contrast, when it is determined that the number of conveyed document sheets D does not reach the excess number (No at Step S13), the processing (determination) at Step 13 is repeated. At Step S14, the document conveyance control section 120 causes execution of document conveyance at the normal speed. For example, when the number of conveyed document sheets D reaches the excess number, the document conveyance mode is changed from the special mode to the normal mode.

By contrast, when the operation panel 8 does not receive an instruction for document conveyance in the special mode at Step S11 (No at Step S11), the routine proceeds to Step S15. At Step S15, the main control section 110 determines whether or not the operation panel 8 receives input indicating reloading of the document sheaf. When it is determined that the operation panel 8 receives input indicating reloading of the document sheaf (Yes at Step S15), the routine proceeds to Step S16.

At Step S16, the document conveyance control section 120 causes the lift plate 17 to descend. In the configuration as above, the lift plate 17 is in a state capable of receiving reloading of the document sheaf. Then at Step S17, the main control section 110 determines whether or not the operation panel 8 receives an instruction to execute a job involving document conveyance. When the determination result is that the operation panel 8 receives such a job execution instruction (Yes at Step S17), the routine returns to Step S1. By contrast, when the operation panel 8 does not receive such a job execution instruction (No at Step S17), the processing (determination) at Step S17 is repeated.

By contrast, when the operation panel 8 does not receive input indicating reloading of the document sheaf at Step 15 (No at Step S15), the routine proceeds to Step S18. At Step S18, the main control section 110 determines whether or not the operation panel 8 receives a reset operation. The reset operation is a user's pushing of a reset key (hard key) on the operation panel 8, for example. When it is determined that the operation panel 8 receives the reset operation (Yes at Step S18), the control is ended. By contrast, when it is determined that the operation panel 8 does not receive the reset operation (No at Step S18), the routine proceeds to Step S11.

Figure 11:
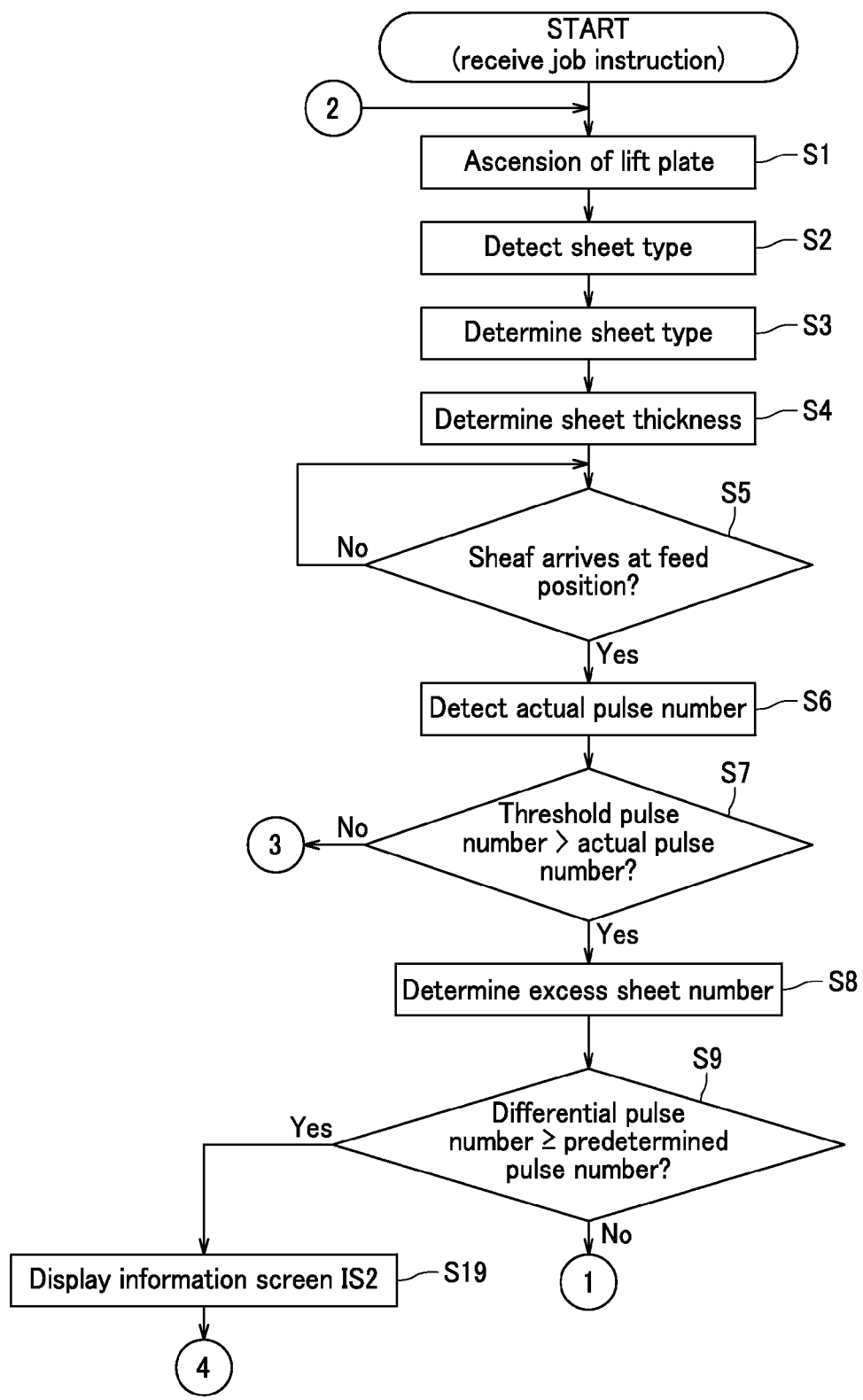
FIG. 11 is a flowchart depicting a flow of control performed in response to the document feeder receiving an instruction to execute a job involving document conveyance according to the embodiment of the present disclosure.

When a pulse number obtained by subtracting the actual pulse number from the threshold pulse number, that is, a differential pulse number, is not less than the predetermined pulse number at Step S9 in FIG. 11 (Yes at Step S9), the routine proceeds to Step S19. At Step S19, the main control section 110 causes the operation panel 8 to display the information screen IS2 (see FIG. 10). Then, the routine proceeds to Step S16.

Figure 12:
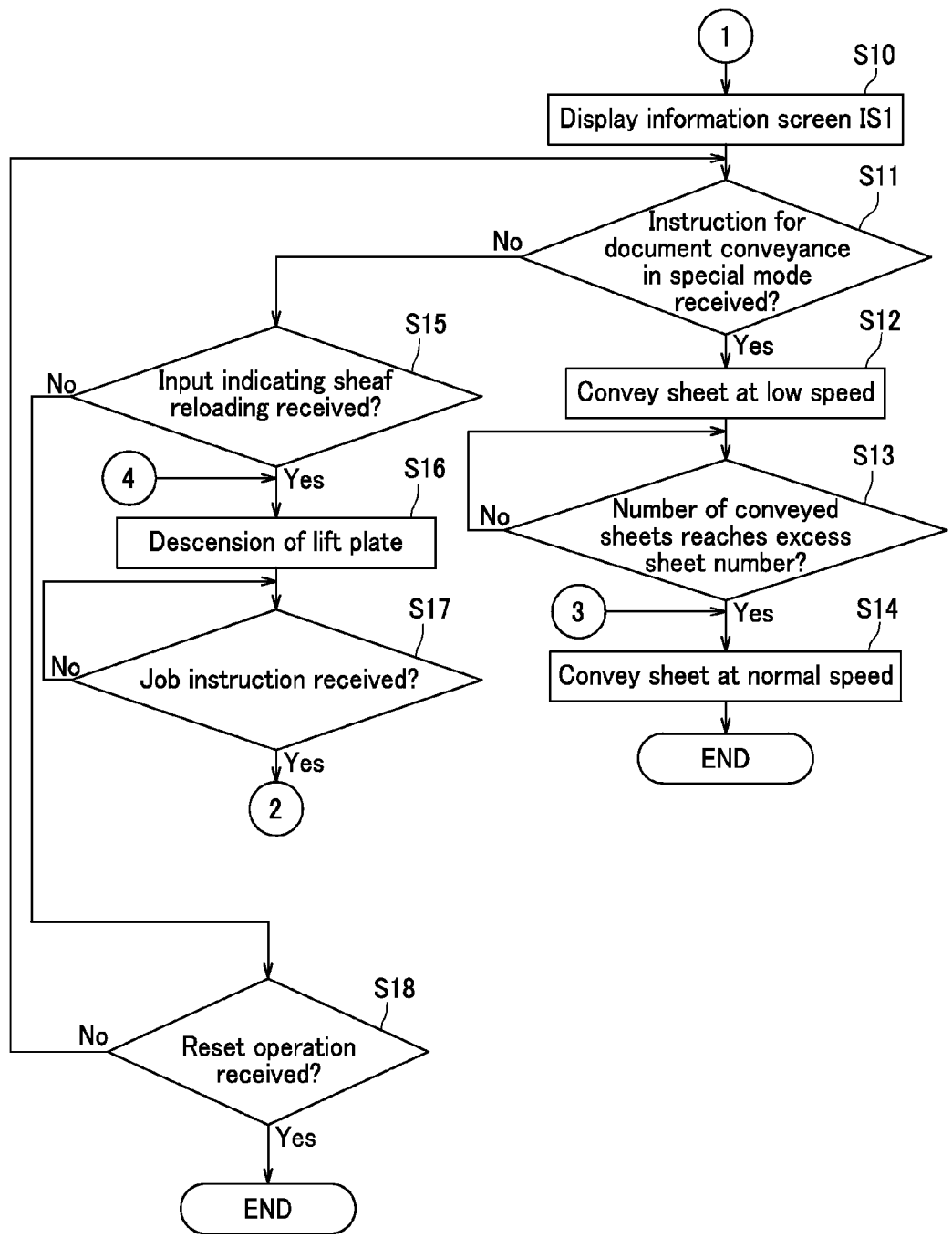
FIG. 12 is a flowchart depicting a flow of control performed in response to the document feeder receiving the instruction to execute the job involving document conveyance according to the embodiment of the present disclosure.

When determination by the document conveyance control section 120 at Step S7 is such that the actual pulse number is not less than the threshold pulse number (No at Step S7), in other words, the number of the document sheets D in the document sheaf loaded on the lift plate 17 does not exceed the maximum sheet number, the routine proceeds to Step S14 in FIG. 12. The document conveyance control section 120 accordingly causes execution of document conveyance at the normal speed (in normal mode).

As described above, the document feeder 1 according to the present embodiment includes the document conveyance path 11 along which an original document is conveyed. The document feeder 1 further includes the lift plate 17, the sheet feed section A1, the document conveyance section 1B, the upper limit sensor US, the document conveyance control section 120 (control section), the storage section 122, and the operation panel 8 (operation display section).

A document sheaf of one or more document sheets D is loaded on the lift plate 17. The lift plate 17 waits for loading of the document sheaf at the predetermined standby position WP. The lift plate 17 ascends from the standby position WP with the document sheaf loaded thereon to lift the document sheaf up to the predetermined feed position UP.

The sheet feed section A1 performs the document feeding operation for feeding to the document conveyance path 11 the document sheets D in the document sheaf that arrives at the feed position UP. The document conveyance section 1B performs the document conveyance operation for conveying along the document conveyance path 11 a document sheet D in the document sheaf fed to the document conveyance path 11.

In response to the document sheaf arriving at the feed position UP, the upper limit sensor US outputs a value indicating that the document sheaf arrives at the feed position UP. The document conveyance control section 120 determines whether or not the document sheaf arrives at the feed position UP based on a value (output value) output from the upper limit sensor US.

The storage section 122 stores the first travel amount. The first travel amount is a travel amount of the lift plate 17 from the standby position WP necessary for the lift plate 17 to cause the topmost part of the document sheaf loaded on the lift plate 17 to arrive at the feed position UP in a situation in which the document sheaf is has the maximum permitted thickness. The operation panel 8 receives an input operation and displays information.

The document conveyance control section 120 further obtains the second travel amount. The second travel amount is a travel amount of the lift plate 17 taken to cause the topmost part of the document sheaf to arrive at the feed position UP after a start of ascension of the lift plate 17 from standby position WP. When the second travel amount is less than the first travel amount, the document conveyance control section 120 determines that the number of the document sheets D in the document sheaf loaded on the lift plate 17 exceeds the maximum sheet number. In response to determining by the document conveyance control section 120 that the number of the document sheets D in the document sheaf loaded on the lift plate 17 exceeds the maximum sheet number, the operation panel 8 displays the information screen IS1 or IS2 for notifying that the number of the document sheets D in the document sheaf loaded on the lift plate 17 exceeds the maximum sheet number.

In the configuration according to the present embodiment, in a situation in which the number of the document sheets D in the document sheaf loaded on the lift plate 17 exceeds the maximum sheet number, the information screen IS1 or IS2 for notifying so to a user is displayed. Thus, the user can notice that the number of the document sheets D in the document sheaf loaded on the lift plate 17 exceeds the maximum sheet number. In such a situation, the user who receives the notification through the information screen IS1 reloads the document sheaf on the lift plate 17 so that the number of the document sheets D to be loaded does not exceed the maximum sheet number. By such an operation, a non-feed jam can be prevented from occurring that may be caused due to the number of the document sheets D in the document sheaf loaded on the lift plate 17 exceeding the maximum sheet number. In consequence, user-friendliness can be increased.

In the configuration according to the present embodiment, the storage section 122 stores the first travel amount. The first travel amount is a travel amount of the lift plate 17 necessary for the lift plate 17 to cause a topmost part of a document sheaf loaded on the lift plate 17 to arrive at the feed position UP after a start of ascension of the lift plate 17 from the standby position WP in a situation in which the thickness of the document sheaf is equal to the maximum thickness. Further, the second travel amount is obtained. The second travel amount is a travel amount of the lift plate 17 taken to cause the topmost part of the document sheaf to arrive at the feed position UP after a start of ascension of the lift plate 17 from the standby position WP. The second travel amount is then compared with the first travel amount. From the above, determination can be readily made as to whether or not the number of the document sheets D in the document sheaf loaded on the lift plate 17 exceeds the maximum sheet number.

The document feeder 1 in the present embodiment further includes the sheet type detection section 19 that detects a sheet type of the document sheets D in the document sheaf loaded on the lift plate 17, as described above. The storage section 122 stores a preset sheet thickness for each of one or more sheet types. On the basis of the sheet type detected by the sheet type detection section 19, the document conveyance control section 120 then selects a sheet thickness corresponding to the sheet type of the document sheets D in the document sheaf loaded on the lift plate 17. The document conveyance control section 120 then obtains an excess thickness of the document sheaf loaded on the lift plate 17 over the maximum thickness based on the difference between the first and second travel amounts, specifically, a pulse number obtained by subtracting the actual pulse number from the threshold pulse number. On the basis of the excess thickness and the sheet thickness corresponding to the sheet type detected by the sheet type detection section 19, the document conveyance control section 120 further obtains an excess number of the document sheets D in the document sheaf loaded on the lift plate 17 over the maximum sheet number. While displaying the information screen IS1, the operation panel 8 provides information indicating the excess number obtained by the document conveyance control section 120 on the information screen IS1.

The configuration as above can causes a user to recognize the excess number of the document sheets D in the document sheaf loaded on the lift plate 17 over the maximum sheet number. As a result, the user can readily determine the number of document sheets D to be removed from the current document sheaf in reloading the document sheaf. Thus, user-friendliness can be increased. Detection of a sheet type of the document sheets D in the document sheaf loaded on the lift plate 17 by the sheet type detection section 19 can result in easy obtainment of the excess number.

Further in the present embodiment, the document conveyance control section 120 adopts the normal and special modes, and the operation panel 8 receives while displaying the information screen IS1, input indicating as to whether or not to execute document conveyance in the special mode. In response to receiving input indicating execution of document conveyance in the special mode by the operation panel 8, the document conveyance control section 120 causes the document conveyance section 1B to convey in the special mode (at a low speed) the excessive number of document sheets D in the document sheaf loaded on the lift plate 17. The document conveyance control section 120 then causes the document conveyance section 1B to convey in the normal mode (at a normal speed) other document sheets D remaining after the excess number of document sheets D are conveyed. Conveyance of the document sheets D in the special mode as above can reduce occurrence of a non-feed jam even without a user's reloading of the document sheaf. Thus, user-friendliness can be increased. Specifically, the above configuration can eliminate the need for a user to reload the document sheaf.

Furthermore, in the present embodiment, while displaying the information screen IS1, the operation panel 8 receives input indicating as to whether or not to reload the document sheaf and provides on the information screen IS1 information indicating that reloading the document sheaf after being divided into a plurality of sheaves can reduce conveyance time period. In response to receiving input indicating reloading of the document sheaf by the operation panel 8, the lift plate 17 descends toward the standby position WP. In the above configuration, the lift plate 17 is in a state capable of receiving reloading of a document sheaf. The document conveyance control section 120 then causes the document conveyance section 1B to convey in the normal mode a document sheet D in the document sheaf reloaded on to the lift plate 17 after being divided into a plurality of sheaves. In the configuration as above, user-friendliness can be increased for a user who wants to quickly complete a job involving document conveyance.

Still further, in the present embodiment, upon the document conveyance control section 120 determining that a travel amount (second travel amount) of the lift plate 17 from the standby position WP necessary for the lift plate 17 to cause the document sheaf to arrive at the feed position UP is less than the first travel amount by the predetermined amount or more, the sheet feed section 1A and the document conveyance section 1B do not perform the document feeding operation and the document conveyance operation, respectively, as described above. Specifically, when the document conveyance control section 120 determines that the actual pulse number is less than the threshold pulse number by the predetermined pulse number or more, the document feeding operation and the document conveyance operation are not performed. The operation panel 8 then provides on the information screen IS2 information requesting reloading of the document sheaf. The configuration as above can ensure that a user is caused to reload the document sheaf in a situation in which occurrence of a non-feed jam is highly probable. Thus, occurrence of a non-feed jam can be reduced.

Furthermore, in the present embodiment, a stepping motor is employed as the lift motor M4 that transmits drive power to the lift plate 17 to cause the lift plate 17 to ascend and descend, as described above. The stepping motor rotates by receiving a supply of drive pulses. The document conveyance control section 120 then obtains as the second travel amount the number of drive pulses supplied to the lift motor M4 (stepping motor) during a time period from a start of ascension of the lift plate 17 from the standby position WP to arrival of the topmost part of the document sheaf at the feed position UP. The configuration as above can readily obtain the second travel amount.

In the present embodiment, while displaying the information screen IS1, the operation panel 8 provides information for notifying that a jam is likely to occur on the information screen IS1, as described above. The configuration as above can cause a user to notice that a jam is likely to occur in a situation in which the number of the document sheets D in the document sheaf loaded on the lift plate 17 exceeds the maximum sheet number.

The embodiment disclosed as above is an example in all aspects and should not be taken to limit the present disclosure. The scope of the present disclosure is defined by the appended claims rather than the description of the above embodiment and includes any alterations within the meaning and scope equivalent to the scope of the claims.

What is claimed is:

1. A document feeder comprising:
a document conveyance path along which an original document is conveyed;
a lift plate configured to wait for loading of a document sheaf of one or more document sheets at a predetermined standby position, and to ascend from the standby position with the document sheaf loaded thereon to lift the document sheaf up to a predetermined feed position;
a sheet feed section configured to perform a document feeding operation for feeding to the document conveyance path, a document sheet in the document sheaf that arrives at the feed position;
a document conveyance section configured to perform a document conveyance operation for conveying along the document conveyance path, the document sheet in the document sheaf fed to the document conveyance path;
an upper limit sensor configured to in response to the document sheaf arriving at the feed position, output a value indicating that the document sheaf arrives at the feed position;
a control section configured to determine whether or not the document sheaf arrives at the feed position based on a value output from the upper limit sensor;
a storage section configured to store a first travel amount that is a travel amount of the lift plate from the standby position necessary for the lift plate to cause a topmost part of the document sheaf loaded on the lift plate to arrive at the feed position in a situation in which the document sheaf has a maximum permitted thickness; and
an operation display section configured to receive an input operation and to display information, wherein
the control section obtains a second travel amount and determines that the number of document sheets in the document sheaf loaded on the lift plate exceeds a preset maximum sheet number when the second travel amount is less than the first travel amount, the second travel amount being a travel amount of the lift plate taken to cause the topmost part of the document sheaf to arrive at the feed position after a start of ascension of the lift plate from the standby position, and
in response to determining by the control section that the number of the document sheets in the document sheaf loaded on the lift plate exceeds the maximum sheet number, the operation display section displays an information screen for notifying that the number of the document sheets in the document sheaf loaded on the lift plate exceeds the maximum sheet number.

2. The document feeder according to claim 1, further comprising
a sheet type detection section configured to detect a sheet type of the document sheets in the document sheaf loaded on the lift plate, wherein
the storage section further stores a preset sheet thickness for each of one or more sheet types,
the control section
selects a sheet thickness corresponding to the sheet type detected by the sheet type detection section;
obtains an excess thickness of the document sheaf loaded on the lift plate over the maximum thickness based on a difference between the first and second travel amounts; and
obtains an excess number of document sheets in the document sheaf loaded on the lift plate over the maximum sheet number based on the excess thickness and the sheet thickness corresponding to the sheet type detected by the sheet type detection section, and
while displaying the information screen, the operation display section provides information indicating the excess number obtained by the control section on the information screen.

3. The document feeder according to claim 2, wherein
the control section adopts a normal mode and a special mode, the normal mode being a mode to cause the document conveyance section to convey a document sheet at a normal speed, the special mode being a mode to cause the document conveyance section to convey a document sheet at a speed lower than that in the normal mode,
while displaying the information screen, the operation display section receives input indicating as to whether or not to execute document conveyance in the special mode, and
in response to receiving input indicating execution of document conveyance in the special mode by the operation display section, the control section causes the document conveyance section to convey in the special mode the excess number of document sheets in the document sheaf loaded on the lift plate and to convey in the normal mode other document sheets remaining after the excess number of document sheets are conveyed.

4. The document feeder according to claim 3, wherein
while displaying the information screen, the operation display section receives input indicating as to whether or not to reload the document sheaf and provides on the information screen information indicating that reloading the document sheaf after being divided into a plurality of sheaves can reduce a conveyance time period,
in response to receiving input indicating reloading of the document sheaf by the operation display section, the lift plate descends toward the standby position, and
the control section causes the document conveyance section to convey in the normal mode the document sheet in the document sheaf reloaded onto the lift plate after being divided into a plurality of document sheaves.

5. The document feeder according to claim 1, wherein
upon the control section determining that the second travel amount is less than the first travel amount by a predetermined amount or more:
the sheet feed section does not perform the document feeding operation and the document conveyance section does not perform the document conveyance operation; and
the operation display section provides on the information screen information requesting reloading of the document sheaf.

6. The document feeder according to claim 1, further comprising
a stepping motor configured to rotate by receiving a supply of drive pulses, wherein
the lift plate ascends and descends by receiving drive power from the stepping motor, and
the control section obtains as the second travel amount the number of drive pulses supplied to the stepping motor during a time period from a start of ascension of the lift plate from the standby position to arrival of the topmost part of the document sheaf at the feed position.

7. The document feeder according to claim 1, wherein
while displaying the information screen, the operation display section provides information for notifying that a jam is likely to occur on the information screen.

8. An image forming apparatus comprising the document feeder according to claim 1.

* * * * *